Oct. 31, 1939.  B. H. THURMAN  2,178,532
METHOD OF FORMING SAPONIFIED REACTION PRODUCTS
Filed Feb. 14, 1936
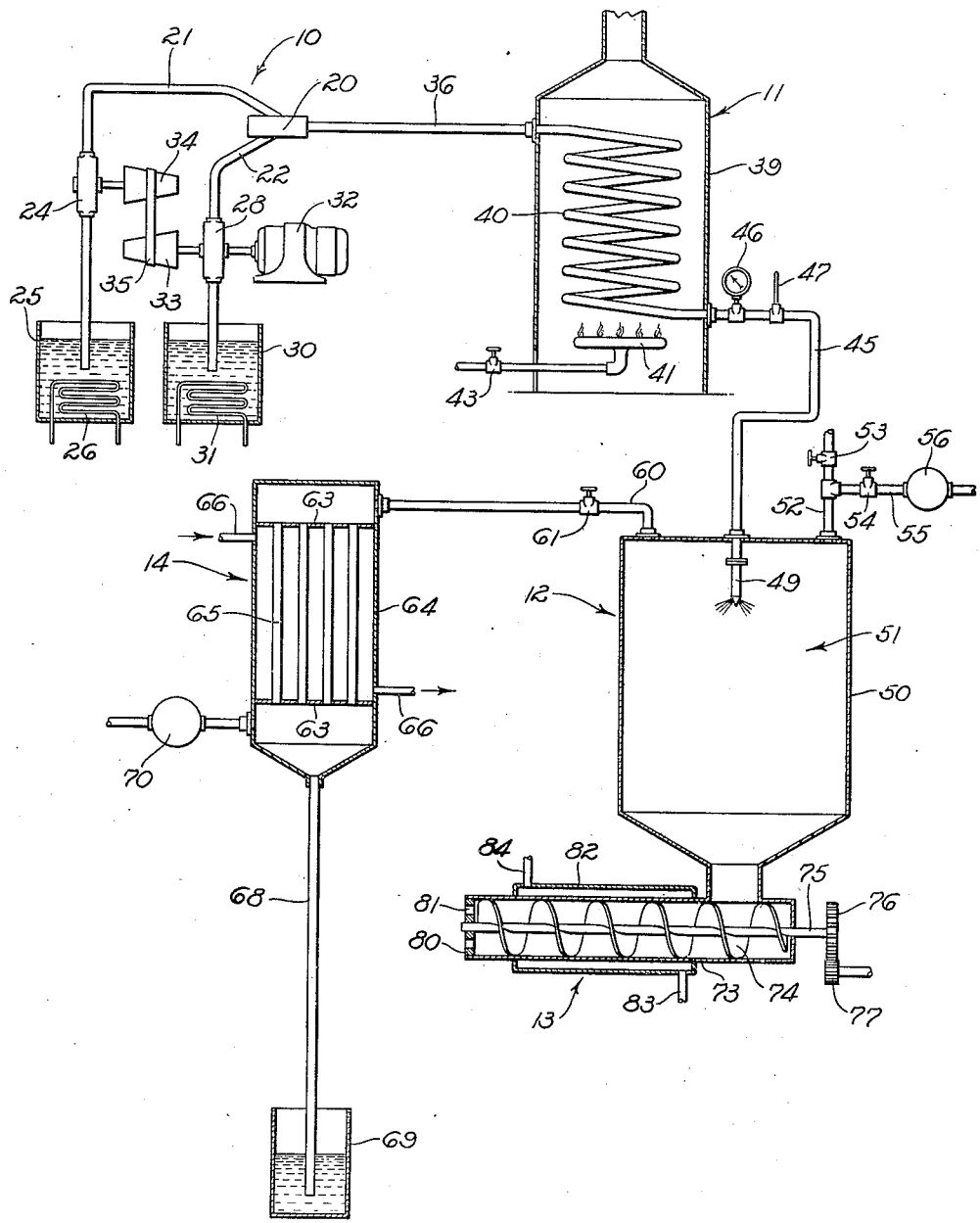
INVENTOR
BENJAMIN H. THURMAN
BY
Ford W. Harris
ATTORNEY.

Patented Oct. 31, 1939

2,178,532

UNITED STATES PATENT OFFICE 2,178,532

METHOD OF FORMING SAPONIFIED REACTION PRODUCTS

Benjamin H. Thurman, Bronxville, N. Y., assignor to Refining, Inc., Reno, Nev., a corporation of Nevada Application February 14, 1936, Serial No. 63,973

6 Claims. (Cl. 260—105)

My invention relates to a novel method and apparatus for forming saponified reaction products such as soap, rosin size, etc. Such products result from the soap forming reaction between a saponifiable material, such as fat, glyceride oils, resinous materials, etc., and a saponifying material which effects a soap-forming reaction. This saponifying material is usually an aqueous alkaline solution, which term is herein applied to aqueous solutions of various hydroxides such as sodium hydroxide, and also to aqueous solutions having an alkaline reaction, such as aqueous solution of carbonates, sodium carbonate being a typical example.

One of the important objects of the present invention is to provide a novel process and apparatus in which substantially complete saponification of a saponifiable material can take place in a closed system by the use of a carbonate such as sodium carbonate as a saponifying material. It has heretofore been considered impossible to carry such a saponifying reaction to completion in a closed system by using only the theoretical quantity of sodium carbonate necessary to neutralize and thus saponify the acids present or derivable from the saponifiable material. The novel effect obtainable by use of my process and apparatus can best be understood from a consideration of the following factors.

Considering by way of example the production of rosin size by reaction between rosin and sodium carbonate, this reaction is an irreversible one in an open system, and can go to completion in such a system. Rosin contains as an acid abietic acid ($C_{19}H_{29}COOH$), and the reaction with sodium carbonate in an open system, for instance in an open kettle, can be expressed as follows:

(1) $2C_{19}H_{29}COOH + Na_2CO_3 = 2C_{19}H_{29}COONa + CO_2 + H_2O$

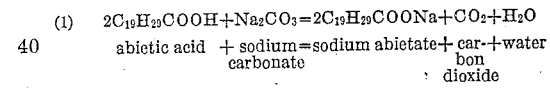

This is not an equilibrium reaction. In other words, the abietic acid and sodium carbonate produce sodium abietate, carbon dioxide and water, but the sodium abietate does not tend to combine with the carbon dioxide and water to give back abietic acid and sodium carbonate. In such a process there is no difficulty in saponifying or neutralizing all of the acid with the calculated equivalent of sodium carbonate.

However, in a closed system operated as a batch process this reaction cannot go to completion. At least a part of the carbon dioxide combines with the water to form carbonic acid. Retention of this carbonic acid causes it to combine with some of the sodium abietate formed to give sodium carbonate, and the sodium carbonate can further combine with the carbonic acid to yield sodium bicarbonate. Thus, if a batch of rosin is confined in a closed space with sodium carbonate, the reaction may be expressed as follows:

(2) $2C_{19}H_{29}COOH + Na_2CO_3 =$

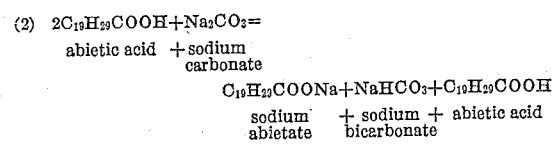

$C_{19}H_{29}COONa + NaHCO_3 + C_{19}H_{29}COOH$ sodium  + sodium + abietic acid
abietate  bicarbonate It is an object of the present invention to completely saponify a saponifiable material by use of sodium carbonate in calculated substantially equivalent amounts in a closed system by continuously supplying the saponifiable material and the sodium carbonate to a closed reaction zone, permitting a portion of the reaction to take place in this zone, and thereafter releasing the pressure to permit the reaction to go to completion and liberate carbon dioxide which is removed. In my process the main reaction occurring in the reaction zone is expressed by Equation 2 above. When the products of this reaction, herein termed "intermediate reaction products", are discharged into a zone of lower pressure, the saponifying reaction can proceed to completion as expressed in the following equation:

(3) $C_{19}H_{29}COOH + NaHCO_3 = C_{19}H_{29}COONa + CO_2 + H_2O$

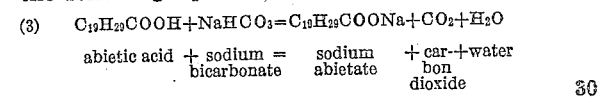

This zone of lower pressure is preferably a confined space from which the carbon dioxide and the resulting soap can be separately and continuously withdrawn to maintain the lower pressure therein. The water is usually in the form of steam and can be withdrawn with the carbon dioxide. This zone thus not only serves to permit completion of the reaction, but also serves as a separating chamber for the saponified products and the gases, the term "gas" as herein used referring to either gases or vapors.

It is an object of the present invention to partially saponify in an elongated reaction zone, and to further saponify in a zone of lower pressure from which any gases liberated by the reaction can be continuously removed.

It is a further object of the present invention to maintain a substantially oxygen-free atmosphere in this low pressure zone or separating chamber to prevent deleterious oxidizing reaction affecting the newly formed saponified products.

The above mentioned desirable results accrue from the use of various saponifiable materials in conjunction with sodium carbonate as a saponifying material, and are not limited to the use of rosin. Equations similar to those above can be written for the various glycerides, fats, etc., with the sole difference that such materials are first subjected to a fat-splitting reaction in the main reaction zone to form fatty acids which act in a manner illustrated by the above equations. However, when making rosin size by the two-step process represented by the above equations, I have found that it is possible to produce a non-burning rosin size. Extreme difficulty is experienced with the usual rosin size due to the tendency for spontaneous combustion. This difficulty is completely eliminated if the finished product is formed by my process.

It is an object of the present invention to provide a novel method of continuously producing a non-burning rosin size in a closed system.

In producing this non-burning rosin size it is not necessary to use sodium carbonate as a saponifying material. Various other aqueous alkaline solutions can be utilized with complete success.

Nor is it necessary in producing this non-burning rosin size to utilize rosin as a saponifiable material. The invention is adapted to saponification of various resinous materials. As herein used, the term "resinous material" includes any of those resinous substances at present utilized in the manufacture of rosin size. For instance, the process may be utilized in conjunction with the viscous exudation produced by incising the trunks of pine trees or certain other coniferous trees. In other instances the process can be used to saponify purified or naturally-occurring rosin. The term also includes gum resins and oleo-resins and other such materials containing auxiliary substances in addition to the truly resinous substance.

The particles of rosin soap formed by the reaction are at relatively high temperature, and I have discovered that if these particles are kept from contact with oxygen, or air, no peroxides will be formed and the resulting product will be a non-burning rosin size.

It is an object of the present invention to cool the particles of rosin soap in the presence of a non-oxidizing atmosphere substantially free of oxygen, or in a confined space from which oxygen or oxygen-containing substances are absent, this cooling being carried to such an extent that when the particles are exposed to the air, no peroxides will be formed.

When the particles of soap are discharged into the lower-pressure zone, water vapor will be liberated. In addition, the final reaction will liberate carbon dioxide.

It is an object of the present invention to effectively blanket the soap particles in the separating chamber by carbon dioxide, water vapor, or a mixture of water vapor and carbon dioxide.

With certain types of resinous materials from which turpentine can be distilled, it is possible to distil off the turpentine during the saponifying reaction. Thus, if an elongated reaction zone and an enlarged separating chamber are used, turpentine vapors can be withdrawn from the separating chamber.

It is an object of the present invention to provide such a process, and to condense the turpentine vapors either along with the water vapors or by utilization of the principles of fractional condensation.

Other objects and advantages of the invention will be apparent to those skilled in the art from the following description.

In the drawing, I have illustrated one form of apparatus capable of performing the methods herein disclosed, though it will be clear that other types of apparatus may be utilized without departing from the spirit of the invention, the illustrated embodiment being set forth only by way of example.

In general, the complete embodiment illustrated includes a proportioning-mixing means 10, a heating means 11, a separating means 12, a means 13 for withdrawing the saponified products, and a condenser means 14.

The primary function of the proportioning-mixing means 10 is to supply to the heating means 11 proportioned quantities of saponifiable and saponifying materials. By way of illustration the process will be described in detail with reference to resinous material as the saponifiable material and an aqueous solution of sodium carbonate as the saponifying material.

While various types of proportioning-mixing means 10 may be utilized, I have found it eminently satisfactory to utilize a mixing device 20 to which is delivered properly proportioned streams of resinous material and sodium carbonate. While mechanical mixing means may be utilized, this is not essential. My experiments indicate that very efficient action can be obtained by merely bringing streams of the resinous material and sodium carbonate solution into contact with each other in a chamber formed by the mixing device 20.

To supply the properly proportioned streams to the mixing device 20, the means 10 provides a pump 24 intaking from a tank 25 containing the resinous material, this pump discharging into a pipe 21. A heating coil 26 or any other suitable heating means may be utilized to liquefy the resinous material in the tank 25 or to preliminarily heat this material. Usually it is only necessary to supply sufficient heat to bring the resinous material into such state that it can be readily pumped by the pump 24.

Similarly, a pump 28 withdraws the sodium carbonate solution from a tank 30 and delivers this solution under pressure to a pipe 22. Heating means 31 may be utilized to heat the material in the tank 30, though this is not always essential.

The pumps 24 and 28 may be separately driven at properly proportioned speeds, though the system illustrated in the drawing includes a drive means 32, preferably of the variable speed type, and driving both of these pumps. In operatively connecting the pumps to the drive means it is desirable to utilize a variable speed means so that the relative speeds of the pumps may be changed to vary the proportions of resinous material and sodium carbonate solution delivered to the mixer 20. Diagrammatically this means is shown as including a pair of cone pulleys 33 and 34 connected by a belt 35.

The properly proportioned materials, preliminarily mixed, move from the mixer 20 through a pipe 36 to the heater 11. This heater serves to heat the materials while confined in a closed space to exclude contact with the atmosphere, and to prevent escape of the carbon dioxide formed by the reaction if sodium carbonate is used as the saponifying material. One type of heater well adapted to the present process includes a shell 39 in which is disposed a coil 40 to which the mixed products are delivered by the pipe 36, this coil being externally heated by any suitable means such as a burner 41. While no automatic means is shown for controlling this burner, it is within the scope of the present invention to automatically control the burner in response to the condition of the reaction products moving through the coil 40. However, it is quite satisfactory to operate the process by manually controlling the burner 41 by any suitable means such as a valve 43 which controls the combustible products delivered to this burner.

The space within the coil 40 provides an elongated reaction zone. The intermediate reaction products therein formed are delivered to the separating means 12 from the discharge end of the coil 40 through a pipe 45 which may be provided with pressure and temperature indicating means 46 and 47. It is usually preferable to utilize a restricted orifice for discharging the reaction products into this separating means 12 to develope a back pressure on the reaction zone. A nozzle 49 providing one or more orifices may be utilized in this regard. In other instances, however, it is possible to eliminate such a nozzle means by properly controlling the diameter and length of the coil 40, allowing the frictional forces developed by movement of the products through the coil 40 to build up a pressure in the reaction zone.

The separating means 12 may include any means for separating the gases (such as carbon dioxide, water vapor, and turpentine vapor, if formed) from the remaining portion of the reaction products. Preferably this separating means includes a container 50 defining a separating zone or chamber 51. If the resinous material is of such character that the reaction does not produce material amounts of turpentine vapor, it is often desirable to vent this separating chamber 51 to the atmosphere. A pipe 52, including a valve 53, is shown in this capacity. When so operated, the pressure in the separating zone 51 will be slightly above atmospheric pressure and the gases will move upward through the pipe 52 into the atmosphere after serving their function of blanketing the particles of saponified material settling in this separating chamber.

If it is desired to maintain a reduced pressure in the separating chamber 51, this may be accomplished by partially or completely closing a valve 53 and opening a valve 54 in a pipe 55 leading to a pumping means 56 which may be a blower or other vacuum pump.

If the resinous material is of such character as to liberate considerable quantities of turpentine vapor, this vapor may be advantageously condensed in the condenser means 14. The water vapors formed may be similarly condensed in a separate condenser or in the condenser means 14. In the latter instance, the vapors and the carbon dioxide are withdrawn through a pipe 60 containing a valve 61 and are delivered to a condenser of any suitable type. As shown, this condenser includes heads 63 disposed in a tank 64 and joined by pipes 65 through which the vapors and carbon dioxide move. A suitable cooling medium is circulated through the space around the pipes 65 through connections 66. If desired, the cooling action may be sufficient to condense both the turpentine and water vapors, the condensates dropping through a pipe 68 to a container 69 wherein the water and turpentine separate, and from which these liquids can be separately withdrawn.

If desired, the vapors and carbon dioxide may be forcibly withdrawn from the separating zone 51 to maintain a reduced pressure therein. This may be accomplished by utilization of a pumping means 70 in the form of a blower or other vacuum pump. If a vacuum pump is utilized to materially reduce the pressure in the separating zone 51, the pipe 68 is made sufficiently long to counteract this diminished pressure, containing a column of condensate of sufficient height to effect this result.

The particles of saponified material, such as rosin size, drop to the lower end of the separating chamber 51 and can be intermittently or continuously withdrawn. The latter procedure is preferable, and I have shown the conveyor 13 as performing this function. This conveyor provides a housing 73 in which is positioned a helical vane means shown as comprising a screw 74 rotating in close proximity to the housing 73 and providing a shaft 75 which is turned by any suitable drive means indicated as a gear 76 and a pinion 77 meshing therewith. If desired, any suitable agitating means may be provided in the separating chamber 51 to insure delivery of the saponified particles to the conveyor 13. The conveyor 13 effectively forms a seal between the separating chamber 51 and the atmosphere, the saponified particles filling the spaces between the helical vanes of the screw 74 and contacting the housing 73 to perform this function.

Any suitable means may be utilized for discharging the saponified products from the conveyor housing 73. This means is indicated by the numeral 80 as comprising a plate providing openings 81 through which the particles move. The total area of the openings 81 may be considerably less than the cross-sectional area of the housing 73 to build up a back pressure on the advancing stream of saponified products. This discharge means 80 serves to extrude the saponified products.

If desired, the saponified products moving through the conveyor 13 may be further cooled by spraying a cooling medium on the exterior of the housing 73, or by providing a jacket 82 surrounding this housing and through which a cooling medium is circulated through connections 83 and 84.

By way of example, the operation of such a system in producing a non-burning rosin size utilizing rosin as a saponifiable material and an aqueous solution of sodium carbonate as a saponifying material, may be substantially as follows.

The rosin is suitably melted either in the container 25 or in an external means. The melted rosin and the aqueous solution of sodium carbonate are respectively pumped from the containers 25 and 30 by the pumps 24 and 28 which are adjusted to supply to the mixing device 20 sufficient quantities of these materials to produce a neutral product. It is not necessary to utilize a large excess of the aqueous solution, the process operating best if an amount of aqueous solution of sodium carbonate is supplied which is only substantially sufficient to saponify the melted rosin, neutralizing the acids therein. It will be understood that the pumps 24 and 28 deliver the materials at sufficient pressure to force same through the coil 40 and into the separating chamber 51.

The preliminarily mixed materials enter the elongated reaction zone defined by the coil 40 under considerable pressure. During flow through this reaction zone the mixture is heated and subjected to mild turbulent conditions. Only a part of the complete saponification reaction takes place in this reaction zone. No attempt is made to cause the reaction to go to completion therein. In general, the saponifying reaction taking place in this reaction zone is indicated by equation 2 above. As previously mentioned, the carbon dioxide liberated combines with the water to form carbonic acid which in turn reacts with other materials present to form sodium carbonate and then sodium bicarbonate. Considering the composition of the intermediate reaction products delivered to the nozzle 49, it will be clear that some of the acid content of the rosin will be saponified to form rosin soap, the remaining acid content appearing in these intermediate reaction products. Sodium bicarbonate will also be present, and in some instances water vapors and carbon dioxide may be present. It will be clear that as the reaction zone is in effect a closed space, preventing escape of the carbon dioxide as formed, this carbon dioxide can enter into side reactions, thus preventing the saponifying or neutralizing reaction from going to completion in this reaction zone. Nor will the reaction go to completion if the materials are subjected to heat in the reaction zone for a long period of time. In fact, it is preferable to remove the preliminary reaction products from this reaction zone as soon as the reaction set forth in Equation 2 has been completed, or in some instances even slightly before completion of this reaction.

Conditions of temperature and pressure in the reaction zone are maintained to facilitate this preliminary saponification. It is usually desirable to operate the system at a temperature sufficient to volatilize substantially all of the water while in the coil 40. The necessary temperature will, of course, depend upon the pressure built up in this coil. The pressure at the discharge end of this coil may be relatively high, if desired, due to the action of the nozzle 47, and it will be clear that the pressure at the intake end of the coil 40 will be even higher in view of the fact the pressure progressively decreases in the coil 40 due to frictional factors. Only sufficient temperature need be developed to cause the sodium carbonate to react with the acid of the rosin, this temperature preferably being such that the water will be substantially all in vapor form at the discharge end of the coil 40. It is never necessary to utilize temperatures above approximately 450° F., as indicated by the heat indicating means 47, or corresponding pressures above 400 pounds per square inch.

As the pressure on these intermediate reaction products is reduced, for instance by passing through the nozzle 49, the soap-forming reaction can rapidly proceed to completion. Completion of the reaction in accordance with Equation 3 is permitted due to the fact that the carbon dioxide is allowed to escape or is forcibly withdrawn from the separating chamber 51. The expansion of any gases, such as carbon dioxide and steam, as they move through the nozzle 49 causes cooling, but this is counteracted, at least in part, by the heat of the reaction taking place between the remaining abietic acid and the sodium bicarbonate. The net cooling action does not prevent the reaction from going to completion, though additional heat can be supplied to the separating chamber 51 if desired, this being accomplished either by externally heating the walls of this chamber or by introducing steam into this chamber. Usually, however, this is not necessary and it is usually desirable to operate the process so that the saponified particles, in this instance rosin size, are cooled in this separating chamber.

The final reaction occurring in the separating chamber 51 takes place very rapidly, being completed by the time the saponified products drop to the lower end of this chamber. One of the important features of the present process is that these particles are blanketed by a substantially oxygen-free atmosphere during this settling. By the term "oxygen-free" I have reference to an atmosphere containing substantially no free oxygen which would combine with the particles of saponified material to form peroxides. I have found it very desirable to cool these particles while in a non-oxygen atmosphere, this step resulting in the production of a non-burning rosin size when rosin or other resinous material is saponified with an aqueous alkaline solution, regardless of whether this solution is one of sodium carbonate. The carbon dioxide liberated during the continuing reaction forms such a blanketing agent, as does also the water vapor.

Before the particles of rosin size are introduced into the atmosphere through the discharge means 80, it is very desirable that they be cooled to such an extent that no peroxide will form upon exposure to the atmosphere. The cooling action in the separating chamber 51 is often sufficient in this regard. However, in some instances, it is desirable to cool the rosin size as it moves through the conveyor means 13 and before it is exposed to the atmosphere. This may be accomplished by spraying a cooling medium on the exterior of the housing 73, or by circulating a cooling medium through the jacket 82. If the formation of peroxide is eliminated, the resulting rosin size will be of a non-burning character.

If molten rosin is used as the resinous material, the gases separating in the separating chamber 51 will be essentially composed of water vapors and carbon dioxide. By opening the valve 53 these gases may be allowed to escape into the atmosphere, the valves 54 and 61 being closed. It is sometimes desirable to maintain a reduced pressure on the separating chamber 51, in which event the valve 54 may be opened and the valve 53 partially or completely closed. The pump 56 will then pump the gases from this separating chamber and will regulate the pressure therein. The saponifying reaction will proceed more readily in the separating chamber 51 if this chamber is maintained under sub-atmospheric pressure.

Another mode of operation involves utilization of a resinous material capable of expelling turpentine vapors when heated. For instance, the process may be utilized with a resinous material comprising gum from the pine tree, and in such instance the process can be used to simultaneously saponify the rosin in this gum and distil and recover the turpentine. In such a process the gum will be heated in the tank 25 until sufficiently fluid to be pumped and will be forced, as previously described, into and through the reaction zone defined by the coil 40, along with the aqueous solution. Sodium carbonate or various other aqueous alkaline solutions may be utilized. The temperature at the discharge end of the coil 40 will usually not exceed 450° F., it being usually desirable to so regulate the conditions of temperature and pressure that substantially all of the turpentine is vaporized while in the coil 40. The process may be operated without utilizing sub-atmospheric pressures in the separating chamber 51, though it is often preferable to utilize low pressures at this point. The nozzle 49 may or may not be used. It can be eliminated if the coil 40 is of sufficient length to develop the requisite back pressure in the reaction zone. Here also, if sodium carbonate is used as the saponifying material, the reaction cannot go to completion in the coil 40 but proceeds to completion in the separating chamber 51. The particles of rosin size will be cooled in this separating chamber and will drop to the lower end thereof as previously described, being removed through the conveyor means 13.

The gases in the separating chamber 51 will, in this instance, include carbon dioxide, water vapors, and turpentine vapors. These gases may be removed through the pipe 52 as previously described. However, it is usually preferable to close the valves 53 and 54 and open the valve 61, allowing the pump 70 to withdraw the gaseous products through the pipe 60. If a single condenser is utilized, these gases may be cooled during flow therethrough to such an extent as to fractionally condense only the turpentine vapor, the condensate moving downward in the pipe 68 and entering the tank 69. In this instance the remaining gases including the steam and the carbon dioxide will be withdrawn through the pump 70. It is also possible to cool the gases in the condenser means 14 to such a degree that both the turpentine and water vapors are condensed, the condensate dropping through the pipe 68 and the water and turpentine separating in the tank 69 so as to be separately withdrawn therefrom. The carbon dioxide will be withdrawn through the pump 70.

It is also possible to utilize two condensers for fractionally condensing the turpentine and water vapors without departing from the spirit of the invention. In this instance the condenser closest to the separating chamber 51 will condense the turpentine, the other condenser acting to condense the steam, the remaining carbon dioxide being withdrawn through the pump 70.

While the above examples dealing with resinous materials have been particularly described with reference to sodium carbonate as a saponifying material, it will be clear that other alkaline solutions may be utilized in certain instances. The desirability of the sodium carbonate solution lies in the desirable formation of carbon dioxide and utilization of this gas as a blanketing agent. The cheapness of sodium carbonate is another factor. However, if desired, other alkaline solutions, such as caustic soda, etc., may be utilized as the saponifying material, so long as the system is operated in such a way that no peroxides are formed either in the system or when the particles of rosin size are introduced into the air. The formation of such peroxides may be prevented by excluding contact of oxygen with the saponified products at elevated temperatures.

So also, while the above illustrations deal specifically with the saponification of a resinous material, it should be understood that the invention is not limited thereto.

The present invention comprehends utilization of various saponifiable materials by use of sodium carbonate in a closed system by a continuous process, permitting the saponifying reaction to go to completion with only the calculated equivalent of saponifying material. By way of example, the equations hereinbefore set forth have dealt specifically with acids typical of rosin or resinous material, but it should be understood that similar reactions occur when saponifying various fatty acids by use of sodium carbonate as a saponifying material. I believe it to be novel to perform a saponification with sodium carbonate in two steps in a closed system, and it should be thus understood that the invention is not limited to saponification of a resinous material. However, when the process is used with such a resinous material, a superior non-burning rosin size is produced which finds great utility in the paper-making art.

Various changes and modifications may be made in the process and apparatus without departing from the spirit of the invention as defined by the appended claims.

I claim as my invention:

1. A process of producing rosin size and continuously recovering turpentine from a resinous material capable of liberating turpentine when heated, which process includes the steps of: continuously flowing into a reaction zone closed from the atmosphere a stream of material comprising proportioned quantities of said resinous material and an aqueous alkaline solution; heating said material in said reaction zone to form turpentine vapor and rosin size in the reaction products; continuously moving the reaction products into a separating zone; continuously withdrawing said turpentine vapor from said separating zone; condensing said turpentine vapor; and removing said rosin size from said separating zone.

2. A process as defined in claim 1 in which said alkaline solution is an aqueous solution of sodium carbonate whereby the reaction in said reaction zone produces carbon dioxide which blankets said particles of rosin size in said separating zone, and including the step of withdrawing said carbon dioxide from said separating zone along with said turpentine vapor.

3. A process as defined in claim 1 in which said alkaline solution is an aqueous solution of sodium carbonate and in which said heating of said reaction zone is carried to a degree sufficient to vaporize substantially all the water to form steam and sufficient to form carbon dioxide whereby the particles of rosin size in said separating zone are blanketed by said steam and carbon dioxide to the exclusion of oxygen, and including the steps of withdrawing said steam and carbon dioxide from said separating zone along with said turpentine vapor, and condensing said steam.

4. A process of producing rosin size and continuously recovering turpentine from a resinous material capable of liberating turpentine when heated, which process includes the steps of: heating proportioned quantities of said resinous material and an aqueous alkaline solution; continuously moving the resulting products as a stream into a separating zone; continuously separating the turpentine in vapor form from the rosin size; continuously withdrawing the turpentine vapor; and removing the rosin size from said separating zone.

5. A process as defined in claim 4 including the step of cooling the rosin size after withdrawal from said separating zone and before exposure to the atmosphere.

6. A process as defined in claim 4 in which said turpentine vapor is removed from said separating zone at such rate as to maintain a partial vacuum therein, and in which said rosin size is removed from said separating zone in such manner as not to materially impair said partial vacuum.

BENJAMIN H. THURMAN.